United States Patent Office 3,256,228
Patented June 14, 1966

3,256,228
COMPOSITIONS COMPRISING ETHYLENE/VINYL ACETATE COPOLYMERS AND CHLORINATED WAXES OR CHLORINATED BIPHENYLS
Leo W. Tyran, Lewiston, N.Y., assignor to E. I. du Pont de Nemours and Company, Wilmington, Del., a corporation of Delaware
No Drawing. Filed May 26, 1961, Ser. No. 112,773
2 Claims. (Cl. 260—28.5)

This invention relates to compositions containing ethylene/vinyl acetate copolymers and chlorinated hydrocarbons, in particular to such compositions containing chlorinated paraffin wax or chlorinated biphenyls or triphenyls.

Compositions containing ethylene/vinyl acetate copolymers in combination with materials such as petroleum waxes, coumarone-indene resins, phenol-formaldehyde modified rosins, maleic anhydride modified rosins, pentaerythritol modified rosins, chlorinated rubber and ester-type tackifiers or plasticizers are known in the art and are useful as decorative and moisture-resistant paper and textile coatings and as pressure-sensitive adhesives. These compositions are in many cases multicomponent systems which have desirable properties for the above-indicated uses but which do not have broad applicability in other important use areas.

It is accordingly the object of this invention to provide new ethylene/vinyl acetate copolymer-containing compositions which have valuable properties leading to wide applicability. Another object is to provide ethylene/vinyl acetate copolymer compositions having a remarkable combination of properties including low tack and high coefficient of friction. A further object is to provide essentially binary compositions containing an ethylene/vinyl acetate copolymer and a highly compatible plasticizer-extender. Other objects will appear hereinafter.

These objects are accomplished by providing a composition consisting essentially of 20 to 80% by weight of an ethylene/vinyl acetate copolymer and 80 to 20% by weight of a chlorinated hydrocarbon selected from the group consisting of chlorinated paraffin waxes, chlorinated biphenyls and chlorinated triphenyls.

The ethylene/vinyl acetate copolymers suitable for use in my composition contain 15 to 40% by weight of copolymerized vinyl acetate, and preferably 27 to 33%. The copolymers having an inherent viscosity of 0.45–1.50 as determined with 0.25% of the copolymer in toluene at 30° C. are suitable and those having an inherent viscosity of 0.6–1.2 are preferred. Copolymers with an inherent viscosity higher than 1.5 are difficult to prepare under commercially practical conditions, while copolymers with a viscosity below 0.45 are too low in molecular weight for most uses. The melt index of preferred copolymers, as determined by the tentative ASTM test method D1238–52T (ASTM Standards, 1955, part 6, pp. 292–295), falls within the range of about 0.1 to 200.

Copolymers of ethylene and vinyl acetate suitable for use in my compositions can be prepared by methods well-known in the art. Thus, the procedures described in U.S. Patent 2,200,429 or 2,703,794 may be used. In addition to two-component ethylene/vinyl acetate copolymers, copolymers of ethylene and vinyl acetate containing small amounts, of the order of 0.001 to 3% by weight, of a third or fourth comonomer, are also suitable for use in my compositions. It is only necessary that the ethylene content of the copolymer be at least 60% by weight, and the vinyl acetate content, at least 15% by weight. Thus, copolymers with small amounts of adhesion-promoting monomers such as acrylic acid, methacrylic acid, itaconic acid, acrylamide, $\beta$-dimethylaminoethyl methacrylate, $\beta$-hydroxyethyl acrylate and other monomers having carboxyl, amido, amino or hydroxyl groups may be used in my compositions. The copolymer may also contain a polyunsaturated monomer, such as diallyl maleate, diallyl phthalate, diallyl ether, ethylene glycol dimethacrylate, etc., which in small amounts can be used to give a controlled amount of cross-linking and thus lower the melt index without leading to insolubilization of the copolymer.

The chlorinated hydrocarbons which can be used in my compositions include the chlorinated paraffin waxes, chlorinated biphenyls and triphenyls, and mixtures of these. Chlorinated paraffin waxes vary from pale yellow liquids to brittle resinous solids as the chemically combined chlorine content increases from about 30% to 70% by weight. The liquid materials having an average chlorine content of from about 40 to 50% are especially useful, however the solid materials containing about 70% are also highly compatible with ethylene/vinyl acetate copolymers. Chlorinated paraffin waxes are mixtures and their chemical composition depends on the nature of the paraffin wax and the extent and uniformity of the chlorination. Typical simple formulas which approximate average over-all compositions may be represented as follows:

$C_{20}H_{37}Cl_5$—molecular weight, about 460; chlorine content, about 40%;
$C_{25}H_{46}Cl_6$—molecular weight, about 560; chlorine content, about 40%;
$C_{24}H_{43}Cl_7$—molecular weight, about 580; chlorine content, about 43%;
$C_{25}H_{43}Cl_9$—molecular weight, about 660; chlorine content, about 50%;
$C_{24}H_{29}Cl_{21}$—molecular weight, about 1060; chlorine content, about 70%.

Chlorinated biphenyls and triphenyls suitable for use in my compositions contain from about 30 to 70% by weight of chemically combined chlorine. The pure compounds formed by chlorination of biphenyl or triphenyl are crystalline compounds; however mixtures containing a number of such compounds are either liquids or resins. Especially useful in my compositions are the liquid mixtures of chlorinated biphenyls having an average chlorine content of about 30 to 55%. The resinous materials, which include chlorinated biphenyls containing about 60 to 70% combined chlorine, chlorinated triphenyls containing about 40 to 60% chlorine, and blends of chlorinated biphenyls and triphenyls having an average chlorine content of about 65%, are also compatible with ethylene/vinyl acetate copolymers and may be used to provide "tack" to ethylene/vinyl acetate copolymer compositions.

The compositions of this invention can be prepared in a number of ways, for example, by dissolving the ethylene/vinyl acetate copolymer and chlorinated hydrocarbon in a mutual solvent such as toluene or carbon tetrachloride, by dispersing the ingredients in an aqueous or organic medium, by mixing hot melts of the ingredients, or by milling the ingredients on cold or heated rolls or in a kneader. Other methods will be apparent to those skilled in the art.

Coatings of the compositions of this invention may be applied to various substrates in any conventional manner, for example, by application of solutions or dispersions by brushing, rolling, or spraying, by application of hot melts, or by extrusion.

The examples which follow are intended to illustrate but not to limit this invention. All parts and percentages are given on a weight basis.

Example 1

Fifty parts of an ethylene/vinyl acetate copolymer (28% vinyl acetate; melt index 7) and 50 parts of a chlorinated paraffin wax (average molecular weight, about 460; 40% chlorine content) were dissolved with stirring in 200 parts toluene at 95–100° C. Evaporation of the toluene from a portion of the solution yielded a compatible, non-tacky, rubbery material having a high coefficient of friction. A uniform film of the solution was applied to the backing of a small rug and the toluene then allowed to evaporate at room temperature for 16 hours. The rug was essentially skidproof, nontacky, and remained very flexible. This nonskid, rug-backing composition did not mar common hardwood floor finishes after extended exposure.

The ethylene/vinyl acetate copolymer-chlorinated hydrocarbon compositions of this invention are especially useful as rug-backing compositions because they do not require curing with its associated problems of odor development and discoloration. In addition, the compositions retain their excellent flexibility since they are chemically saturated and do not undergo oxidation.

Example 2

Following the procedure of Example 1, a composition containing 40 parts of an ethylene/vinyl acetate copolymer (32% vinyl acetate; melt index 25), 60 parts of the same type of chlorinated paraffin wax as used in Example 1 and 200 parts toluene was prepared. Application of this solution to a rug backing gave similar results to those in Example 1.

Example 3

A 33% toluene solution of equal parts of ethylene/vinyl acetate copolymer (32% vinyl acetate; melt index 25) and chlorinated paraffin wax (as in Example 1) was applied to titanium dioxide-pigmented paper. The solution was applied with a doctor blade at 90–100° C. to give a coating approximately 1–2 mils thick after drying. The coated side of the paper did not stick to uncoated paper but clung to smooth, nonporous surfaces, simply by hand pressing at ordinary temperatures. The coated paper was readily removed from the smooth surface and could be repeatedly sealed to and peeled from these surfaces without transfer of the coating.

Example 4

A homogeneous melt of 50 parts of ethylene/vinyl acetate copolymer (30.5% vinyl acetate; melt index 19) and 50 parts of chlorinated paraffin wax (as in Example 1) was prepared. Upon cooling, the compatible composition demonstrated the same resistance to sliding on smooth surfaces as shown by the solvent-free compositions in Examples 1 and 2.

Replacement of the chlorinated paraffin wax by a different grade having a molecular weight of about 580 and a chlorine content of 43% gave the same results. Liquid chlorinated paraffin waxes having a molecular weight of about 660 and chlorine content of 50% can also be used. Use of a liquid chlorinated biphenyl mixture (average chlorine content, 54%) in place of the chlorinated paraffin wax gave a homogeneous melt which, upon cooling, possessed the same nonskid properties. A film of the melt applied to the back of a viscose rayon loop construction rug effectively prevented slipping of the rug on smooth floors. Paper coated with the same blend could be rolled and unrolled with no sticking of the coated to the uncoated side, but the coated side clung to smooth, nonporous surfaces such as glass, enamelled steel, etc. Other liquid chlorinated biphenyls containing from about 30 to about 55% chlorine function in the same manner.

As indicated previously, ethylene/vinyl acetate copolymers are compatible with a broad range of chlorinated paraffin waxes and chlorinated biphenyls and triphenyls, including both liquid and resinous materials. The nonskid property shown in Examples 1–4, however, is obtained only with the liquid materials. Accordingly, for use of my compositions as nonslip rug backings, the use of liquid chlorinated hydrocarbons is required. The liquid chlorinated paraffin waxes containing about 40 to 50% chlorine and chlorinated biphenyls having an average chlorine content of about 30 to 55% are preferred. The compositions useful for rug backing contain 30 to 70% by weight of ethylene/vinyl acetate copolymer and 70 to 30% by weight of liquid chlorinated hydrocarbon, with the preferred ranges being 40 to 60% copolymer and 60 to 40% chlorinated hydrocarbon.

The presence of a relatively small amount of a paraffin wax in the ethylene/vinyl acetate copolymer-chlorinated hydrocarbon compositions of this invention results in less flexible compositions which do not retain the skid-proof property of the binary composition. This is indicated by Example 5.

Example 5

The following compositions were prepared:

|  | A, parts | B, parts |
| --- | --- | --- |
| Ethylene/vinyl acetate copolymer [1] | 64.0 | 54.2 |
| Chlorinated paraffin wax (40% chlorine) | 26.2 | 33.3 |
| Paraffin wax (M.P. 143–150° F.) | 9.8 | 12.5 |

[1] Same type as used in Example 1.

Rugs backed with these compositions were stiff and not skid-proof. Moreover, the compositions did not adhere well to the rugs.

The compositions of this invention are also effective as fabric adhesives. An example of this use is shown in Example 6.

Example 6

A thin film (average thickness, 3 mils), prepared from a homogeneous mixture of 80 parts ethylene/vinyl acetate copolymer (28% vinyl acetate, melt index 7) and 20 parts chlorinated paraffin wax (40% chlorine), was placed between two strips of cotton cloth (1" x 6"), and the laminated structure so obtained was heat-sealed at 110° C., 50 lb./in.$^2$ pressure for 4 seconds. A ½"-wide center cut was prepared from the sealed strip by means of a precision cutter. The free ends of the sealed strip were placed in a tensile strength testing machine and pulled in opposite directions at a crosshead speed of 5 in./min. A bond strength of 12 lb./in. was obtained.

The compositions of this invention are effective binders for solid materials as indicated in the following example.

Example 7

The following composition was prepared:

| | Parts |
| --- | --- |
| Ethylene/vinyl acetate copolymer [1] | 16.7 |
| Chlorinated paraffin wax (40% chlorine) | 33.3 |
| Potassium chloride | 50 |

[1] Same type as used in Example 2.

This composition was pourable at 150° C. and rubbery and flexible at room temperature.

The rubbery composition was soaked in water to leach the potassium chloride and convert the material to a sponge-like mass. This material is useful because of its flame-retardant and insulating properties as well as its rubbery and sponge-like character.

Example 8

Compatible mixtures were prepared with the following compositions:

|  | A, parts | B, parts |
| --- | --- | --- |
| Ethylene/vinyl acetate copolymer [1] | 25 | 25 |
| Chlorinated paraffin wax (average molecular weight, about 1060; 70% chlorine) | 75 | |
| Chlorinated triphenyl (60% chlorine) | | 75 |

[1] Same type as used in Example 2.

These compositions are more flexible than the unmodified resinous chlorinated hydrocarbons alone and provide better and more permanent flame-retardant and water-repellent finishes or textile materials.

Combinations of liquid and resinous chlorinated hydrocarbons can be used with ethylene/vinyl acetate copolymers to provide useful, pressure-sensitive compositions. These are illustrated in Example 9.

*Example 9*

The following compositions were prepared:

| | A, parts | B, parts | C, parts |
|---|---|---|---|
| Ethylene/vinyl acetate copolymer | [1] 25 | [1] 25 | [2] 35 |
| Chlorinated triphenyls (60% chlorine) | 50 | 50 | 40 |
| Chlorinated biphenyls (54% chlorine) | 25 | | 25 |
| Chlorinated paraffin wax (40% chlorine) | | 25 | |

[1] 30.5% vinyl acetate, melt index 19.
[2] 33% vinyl acetate, melt index 24.

Coatings were applied from toluene solutions of the above compositions to polyethylene terephthalate films (1 mil thickness). After drying, the coatings were sealed to various substrates under firm hand pressure and the peel adhesion then determined using ½" x 5½" strips following the procedure in Example 6. The results are summarized in the following table:

| Composition | A | B | C |
|---|---|---|---|
| Coating weight: lb./1,000 ft.$^2$ | 6.9 | 6.1 | 7.2 |
| Peel adhesion, g./in. coated film to: | | | |
| Polyethylene terephthalate film | 1,440 | 760 | 1,160 |
| Polypropylene film | 1,100 | 750 | 1,350 |
| Polyvinyl fluoride film | 1,160 | 650 | |
| K-201 Cellophane | 75 | 340 | 330 |
| Glassine paper | 810 | 280 | 360 |
| Aluminum foil | 1,100 | 830 | 1,040 |

These pressure-sensitive adhesive compositions remain tacky after extended storage tests and show no susceptibility to air oxidation.

In addition to the uses for my compositions which have been heretofore described, they are also useful as vibration dampers, for example, in mountings for motors. The low temperature flexibility of my compositions makes them especially valuable for this application in cold climates.

The embodiments of the invention in which an exclusive property or privilege is claimed are defined as follows:

1. A composition consisting essentially of 20 to 80% by weight of an ethylene/vinyl acetate copolymer, said copolymer containing from 15 to 40% by weight of copolymerized vinyl acetate, and 80 to 20% by weight of a liquid chlorinated hydrocarbon selected from the group consisting of chlorinated paraffin waxes containing from about 40% to about 50% by weight of chlorine and chlorinated biphenyls containing from about 30% to about 55% by weight of chlorine.

2. A composition consisting essentially of 30 to 70% by weight of an ethylene/vinyl acetate copolymer, said copolymer containing from 15 to 40% by weight of copolymerized vinyl acetate, and 70 to 30% by weight of a liquid chlorinated hydrocarbon selected from the group consisting of chlorinated paraffin waxes containing from about 40% to 50% by weight of chlorine and chlorinated biphenyls containing from about 30% to 55% by weight of chlorine.

References Cited by the Examiner

UNITED STATES PATENTS

| | | | |
|---|---|---|---|
| 1,527,715 | 2/1925 | Thieme | 260—33.8 |
| 2,096,110 | 10/1937 | Kittredge et al. | 260—33.8 |
| 2,479,130 | 8/1948 | Moose | 260—33.8 |
| 2,485,248 | 10/1949 | Watson et al. | 260—31.6 |
| 2,490,550 | 12/1949 | Sermattei | 260—27 |
| 2,643,238 | 6/1953 | Crozier et al. | 260—33.80 |
| 2,924,532 | 2/1960 | Dereich | 260—28.5 |
| 3,025,167 | 3/1962 | Butler | 260—28.5 |
| 3,048,553 | 8/1962 | Moss | 260—28.5 |

OTHER REFERENCES

Warth, The Chemistry and Technology of Waxes, Reinhold Pub. Corp., New York, pp. 450–451.

MORRIS LIEBMAN, *Primary Examiner.*

MILTON STERMAN, *Examiner.*

J. ZIEGLER, D. C. KOLASCH, B. A. AMERNICK,
*Assistant Examiners.*